US012689585B2

(12) United States Patent
Bandekar et al.

(10) Patent No.: US 12,689,585 B2
(45) Date of Patent: Jul. 21, 2026

(54) CONFIGURABLE SOURCE VIRTUAL ROUTING AND FORWARDING (VRF) IDENTIFIER FOR UNICAST REVERSE PATH FORWARDING (RPF) IN A PROGRAMMABLE NETWORK DEVICE

(71) Applicant: Arista Networks, Inc., Santa Clara, CA (US)

(72) Inventors: Vishal Bandekar, Bangalore (IN); Naina Jalan, Hyderabad (IN)

(73) Assignee: Arista Networks, Inc., Santa Clara, CA (US)

( * ) Notice: Subject to any disclaimer, the term of this patent is extended or adjusted under 35 U.S.C. 154(b) by 561 days.

(21) Appl. No.: 18/303,704

(22) Filed: Apr. 20, 2023

(65) Prior Publication Data

US 2024/0356850 A1     Oct. 24, 2024

(51) Int. Cl.
*H04L 45/745* (2022.01)
*H04L 41/0895* (2022.01)
*H04L 45/586* (2022.01)

(52) U.S. Cl.
CPC ........ *H04L 45/745* (2013.01); *H04L 41/0895* (2022.05); *H04L 45/586* (2013.01)

(58) Field of Classification Search
CPC .. H04L 41/0895; H04L 45/586; H04L 45/745
See application file for complete search history.

(56) References Cited

U.S. PATENT DOCUMENTS

| | | | |
|---|---|---|---|
| 7,944,846 B1 | 5/2011 | Cai et al. | |
| 8,730,967 B1 | 5/2014 | Arad | |
| 8,953,446 B1 * | 2/2015 | Wang .................. | H04L 12/4641 370/231 |
| 9,154,414 B2 | 10/2015 | Seaman-Kossmeyer et al. | |
| 9,853,898 B1 * | 12/2017 | Subramanian ...... | H04L 63/0272 |
| 10,341,259 B1 * | 7/2019 | Singh ...................... | H04L 45/42 |
| 2009/0168666 A1 * | 7/2009 | Unbehagen ........... | H04L 45/502 370/254 |
| 2010/0232435 A1 * | 9/2010 | Jabr ...................... | H04L 12/465 370/395.31 |
| 2014/0079058 A1 | 3/2014 | Cai et al. | |
| 2015/0172170 A1 * | 6/2015 | Bosch ...................... | H04L 45/20 709/238 |
| 2016/0134520 A1 | 5/2016 | Kapadia et al. | |

(Continued)

*Primary Examiner* — Jeong S Park

(74) *Attorney, Agent, or Firm* — Treyz Law Group; Jason Tsai

(57) ABSTRACT

A network device or a system can be configured to support split virtual routing and forwarding (VRF) for unicast reverse path forwarding (RPF). A method is provided that includes receiving a data packet, performing VRF mapping lookup to identify a forwarding VRF identifier and a source VRF identifier, storing at least the source VRF identifier and a VRF profile as metadata, passing the packet through one or more stages in a packet processing pipeline, extracting the source VRF identifier from the metadata, performing RPF lookup based on the extracted source VRF identifier or the forwarding VRF identifier based on the extracted VRF profile from the metadata and a source address of the packet, selectively dropping the packet, performing forwarding lookup based on the forwarding VRF identifier and a destination address of the packet, and selectively forwarding the packet.

15 Claims, 6 Drawing Sheets

(56)                         References Cited

U.S. PATENT DOCUMENTS

| | | | |
|---|---|---|---|
| 2016/0380973 A1 | 12/2016 | Sullenberger et al. | |
| 2020/0389358 A1 * | 12/2020 | Kamath | H04L 41/0672 |
| 2021/0314182 A1 * | 10/2021 | Basavaraj | H04L 12/1881 |
| 2022/0217075 A1 * | 7/2022 | Xie | H04L 45/741 |

* cited by examiner

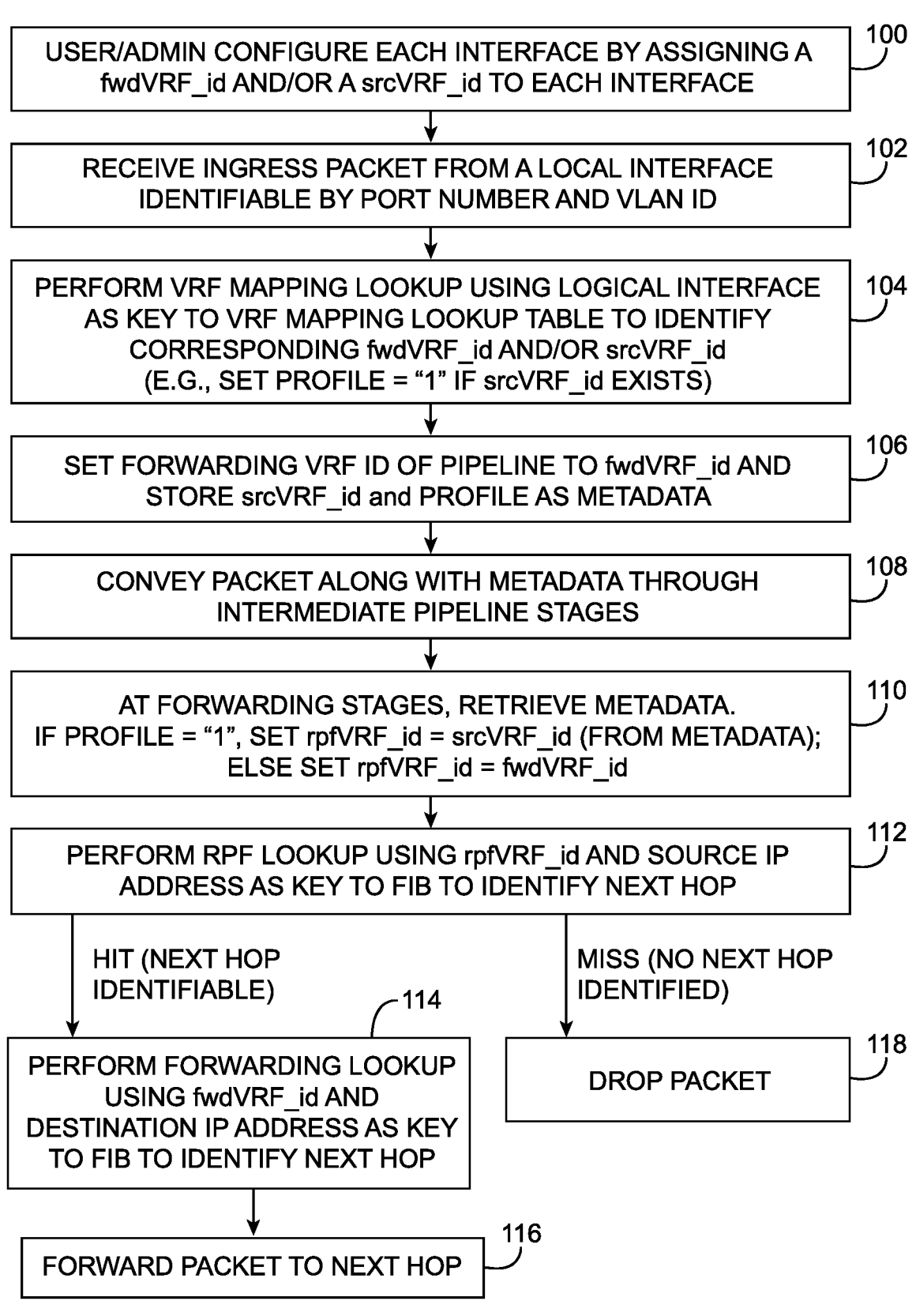

USER/ADMIN CONFIGURE EACH INTERFACE BY ASSIGNING A fwdVRF_id AND/OR A srcVRF_id TO EACH INTERFACE — 100

RECEIVE INGRESS PACKET FROM A LOCAL INTERFACE IDENTIFIABLE BY PORT NUMBER AND VLAN ID — 102

PERFORM VRF MAPPING LOOKUP USING LOGICAL INTERFACE AS KEY TO VRF MAPPING LOOKUP TABLE TO IDENTIFY CORRESPONDING fwdVRF_id AND/OR srcVRF_id (E.G., SET PROFILE = "1" IF srcVRF_id EXISTS) — 104

SET FORWARDING VRF ID OF PIPELINE TO fwdVRF_id AND STORE srcVRF_id and PROFILE AS METADATA — 106

CONVEY PACKET ALONG WITH METADATA THROUGH INTERMEDIATE PIPELINE STAGES — 108

AT FORWARDING STAGES, RETRIEVE METADATA. IF PROFILE = "1", SET rpfVRF_id = srcVRF_id (FROM METADATA); ELSE SET rpfVRF_id = fwdVRF_id — 110

PERFORM RPF LOOKUP USING rpfVRF_id AND SOURCE IP ADDRESS AS KEY TO FIB TO IDENTIFY NEXT HOP — 112

HIT (NEXT HOP IDENTIFIABLE)

MISS (NO NEXT HOP IDENTIFIED)

PERFORM FORWARDING LOOKUP USING fwdVRF_id AND DESTINATION IP ADDRESS AS KEY TO FIB TO IDENTIFY NEXT HOP — 114

DROP PACKET — 118

FORWARD PACKET TO NEXT HOP — 116

FIG. 3

CONFIGURABLE SOURCE VIRTUAL ROUTING AND FORWARDING (VRF) IDENTIFIER FOR UNICAST REVERSE PATH FORWARDING (RPF) IN A PROGRAMMABLE NETWORK DEVICE

BACKGROUND

A network device can be configured to route traffic between an internal network and an external network. The network device may support virtual routing and forwarding (VRF), which is a technology used in computer networking to allow multiple virtual instances of a routing table to coexist on the same network device. Each VRF instance can maintain a separate and independent routing table, which allows for multiple virtual networks to be created on the same physical device without interfering with each other.

Unicast reverse path forwarding (uRPF) is a security feature that validates the source address of an incoming packet to ensure that the incoming packet originated from a legitimate/valid source. If validation of the source address fails, then the packet can be dropped, thus preventing internet protocol (IP) address spoofing attacks from illegitimate sources.

It can be challenging to design a network device that supports multiple VRFs and unicast RPF. A network device is typically connected to both an internal and an external network. The Unicast RPF may be used to limit the source IPs in the incoming packets on the interfaces facing the internal networks to avoid IP spoofing attacks. The network device may be connected to the internal network through multiple interfaces. If these interfaces belong to multiple VRF instances, then routes must be leaked across multiple VRF instances. However, with the route leaking across multiple VRF instances the routing table will include both internal and external routes. Currently, the prior art does not provide a way to enforce RPF to drop source addresses that are not from an internal network. It is within such context that the embodiments herein arise.

BRIEF DESCRIPTION OF THE DRAWINGS

FIG. 3 is a flow chart of illustrative steps for operating a packet processing pipeline to support split virtual routing and forwarding (VRF) operation in accordance with some embodiments.

DETAILED DESCRIPTION

Figure 1:
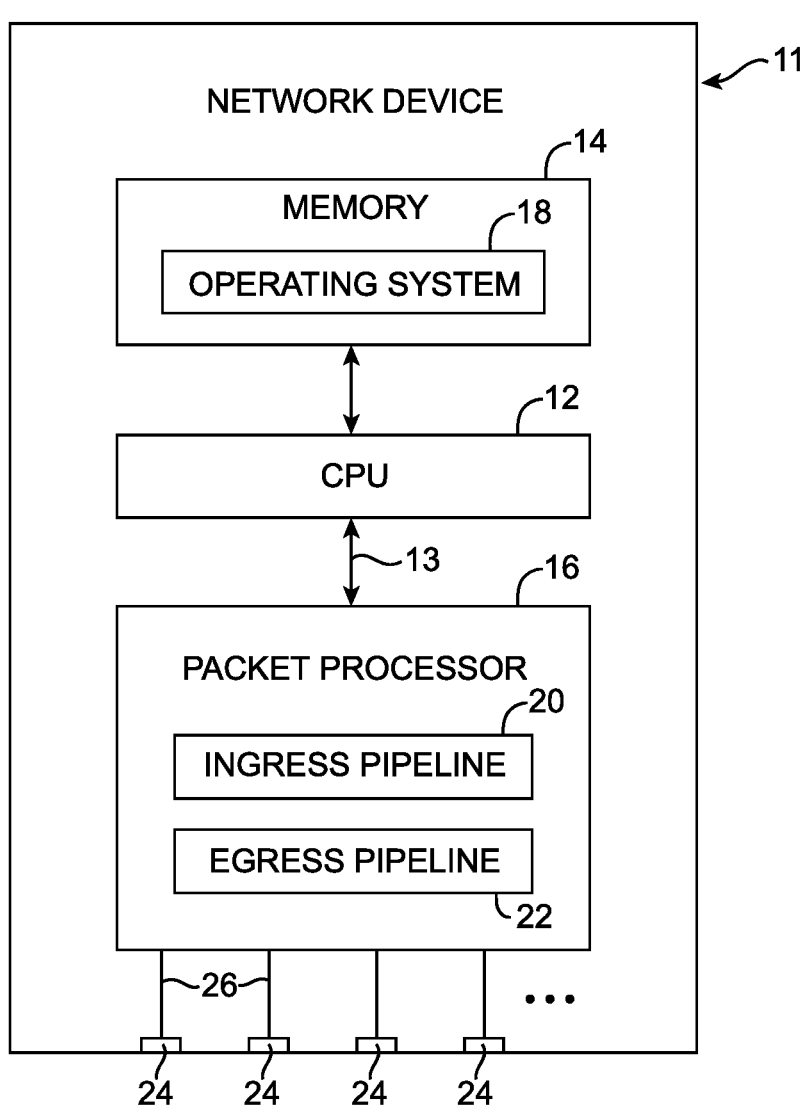
FIG. 1 is a diagram of an illustrative network device configured to route data packets in accordance with some embodiments.

FIG. 1 is a diagram of a network device such as network device 10 that can be used to support virtual routing and forwarding (VRF) and unicast reverse path forwarding (RPF). Network device 10 may be a router, a switch, a bridge, a hub, a repeater, a firewall, a device serving other networking functions, a network device that includes a combination of these functions, or other types of network elements. As shown in FIG. 1, network device 10 may include processing circuitry such as a central processing unit (CPU) 12, storage circuitry including memory 14, and a packet processing circuit such as packet processor 16 all disposed within a housing 11 of device 10. Housing 11 may be an exterior cover (e.g., a plastic exterior shell, a metal exterior shell, or an exterior shell formed from other rigid or semirigid materials) that provides structural support and protection for the components disposed within the housing. In general, processing unit 12 may represent processing circuitry based on one or more microprocessors, graphics processing units (GPUs), host processors, general-purpose processors, microcontrollers, digital signal processors, application-specific integrated circuits (ASICs), application-specific system processors (ASSPs), programmable logic devices such as field-programmable gate arrays (FPGAs), power management integrated circuits (PMICs), a combination of these processors, or other types of processors. Central processing unit 12 may sometimes be referred to herein as a main processor 12.

Processor 12 may be used to run a network device operating system such as operating system (OS) 18 and/or other software/firmware that is stored on memory 14. Memory 14 may include non-transitory (tangible) computer readable storage media that stores operating system 18 and/or any software code, sometimes referred to as program instructions, software, data, instructions, or code. Memory 14 may include nonvolatile memory (e.g., flash memory or other electrically-programmable read-only memory configured to form a solid-state drive), volatile memory (e.g., static or dynamic random-access memory), hard disk drive storage, and/or other storage circuitry. The processing circuitry and storage circuitry described above are sometimes referred to to collectively as control circuitry. Processor 12 and memory 14 are sometimes referred to as being part of a "control plane" of network device 10.

Operating system 18 running in the control plane of network device 10 may exchange network topology information with other network devices using a routing protocol. Routing protocols are software mechanisms by which multiple network devices communicate and share information about the topology of the network and the capabilities of each network device. For example, network routing protocols executed on device 10 may include Border Gateway Protocol (BGP) or other distance vector routing protocols, Enhanced Interior Gateway Routing Protocol (EIGRP), Exterior Gateway Protocol (EGP), Routing Information Protocol (RIP), Open Shortest Path First (OSPF) protocol, Label Distribution Protocol (LDP), Multiprotocol Label Switching (MPLS), intermediate system to intermediate system (IS-IS) protocol, Protocol Independent Multicast (PIM), Virtual Routing Redundancy Protocol (VRRP), Hot Standby Router Protocol (HSRP), and/or other Internet routing protocols (just to name a few).

Processor 12 may be coupled to packet processor 16 via path 13. Packet processor 16 is oftentimes referred to as being part of a "data plane" or "forwarding plane." Packet processor 16 may represent processing circuitry based on one or more network processing units, microprocessors, general-purpose processors, application specific integrated circuits (ASICs), programmable logic devices such as field-programmable gate arrays (FPGAs), a combination of these processors, or other types of processors. Packet processor 16 may be coupled to input-output ports 24 via paths 26 and receives and outputs data packets via input-output ports 24. Ports 24 that receive data packets from other network elements are sometimes referred to as ingress ports, whereas ports 24 through which packets exit out of device 10 towards other network elements are sometimes referred to as egress ports. Ports 24 are sometimes referred to collectively as ingress-egress ports.

Packet processor 16 can analyze the received data packets, process the data packets in accordance with a network protocol, and forward (or optionally drop) the data packets accordingly. Data packets received in the data plane may optionally be analyzed in the control plane to handle more complex signaling protocols. Memory 14 may include information about the speed(s) of input-output ports 24, information about any statically and/or dynamically programmed routes, any critical table(s) such as forwarding tables or forwarding information base (FIB), critical performance settings for packet processor 16, other forwarding data, and/other information that is needed for proper function of packet processor 16.

A data packet is generally a formatted unit of data conveyed over a network. Data packets conveyed over a network are sometimes referred to as network packets. A group of data packets intended for the same destination should have the same forwarding treatment. A data packet typically includes control information and user data (payload). The control information in a data packet can include information about the packet itself (e.g., the length of the packet and packet identifier number) and address information such as a source address and a destination address. The source address represents an Internet Protocol (IP) address that uniquely identifies the source device in the network from which a particular data packet originated. The destination address represents an IP address that uniquely identifies the destination device in the network at which a particular data packet is intended to arrive.

Data packets received in the data plane may optionally be analyzed in the control plane to handle more complex signaling protocols. Packet processor 16 may be configured to partition data packets received at an ingress port 24 into groups of packets based on their destination address and to choose a next hop device for each data packet when exiting an egress port 24. The choice of next hop device for each data packet may occur through a hashing process (as an example) over the packet header fields, the result of which is used to select from among a list of next hop devices in a routing table stored on memory in packet processor 16. Such routing table listing the next hop devices for different data packets is sometimes referred to as a hardware forwarding table, or a hardware forwarding information base (FIB). The routing table may list actual next hop network devices that are currently programmed on network device 10 for each group of data packets having the same destination address. If desired, the routing table may also list actual next hop devices currently programmed for device 10 for multiple destination addresses (i.e., device 10 can store a single hardware forwarding table separately listing programmed next hop devices corresponding to different destination addresses). The example of FIG. 1 showing four ingress-egress ports 24 is merely illustrative. In general, packet processor 16 can be coupled to up to ten input-output ports 24, up to twenty input-output ports 24, up to thirty input-output ports 24, up to fifty input-output ports 24, up to a hundred input-output ports 24, or more than a hundred input-output ports 24.

Packet processing block 16 of FIG. 1 may generally represent one or more packet processors. Each packet processor 16 may include a packet processing pipeline that includes an ingress pipeline 20 and an egress pipeline 22. Each port 24 may have its own ingress pipeline 20 and its own egress pipeline 22. Data packets received at an ingress port 24 may be processed by an ingress pipeline 20 associated with that ingress port, whereas data packets transmitted from an egress port 24 may be processed using an egress pipeline 22 associated with that egress port. Ingress pipeline 20 may forward a data packet to egress pipeline 22 corresponding to a port 24 on which the packet will egress from device 10. Ingress pipeline 20 may include selection circuitry (sometimes referred to as a selector) configured to direct an intermediate data packet and associated metadata produced in the ingress pipeline to an appropriate egress pipeline 22. The selector within ingress pipeline 20 can select an egress pipeline 22 based on information contained in the received data packet.

In some embodiments, network device 10 can be based on a scalable architecture that includes multiple interconnected network chips where the packet processing functionality is distributed between separate ingress and egress pipelines. For example, ingress pipeline 20 and egress pipeline 22 can be implemented using separate logic circuitry. As another example, ingress pipeline 20 and egress pipeline 22 can be implemented as part of separate integrated circuit (IC) chips.

Ingress pipeline 20 can include a parser and a processing engine, sometimes referred to as an ingress parser and an ingress processing engine, respectively. Ingress pipeline 20 can use ingress lookup and editing tables (sometimes referred to as ingress data tables) to provide editing instructions based on the contents of an ingress data packet to drive the ingress processing engine. Generally, when a data packet is received on a port 24 of network device 10, the received data packet feeds into an ingress pipeline 20 associated with that port 24. The parser of that ingress pipeline 20 parses the received data packet to access portions of the data packet. The parsed information can be used as search/lookup keys into ingress data tables to produce metadata that is then used to identify a corresponding egress pipeline and to direct processing in the egress pipeline (e.g., to bridge or route the data packet, to selectively add a tunnel header, etc.).

In some instances, lookup operations can be performed using the ingress data tables to obtain editing instructions that feed into the processing engine to direct editing actions on the data packet. In other instances, the ingress packet might not be edited. In either scenario, the data packet output from an ingress pipeline can sometimes be referred to herein as an "intermediate packet." The intermediate data packet and the metadata output from an ingress pipeline can be forwarded by its associated selector and queued towards an appropriate egress pipeline. In some embodiments, the selector can select the egress pipeline based on information contained in the metadata and/or information contained in the ingress data packet.

Egress pipeline 22 can include its own parser and processing engine. The egress pipeline can include a parser and a processing engine, sometimes referred to as an egress parser and an egress processing engine, respectively. The egress pipeline can access egress lookup and editing tables (sometimes referred to as egress data tables) to provide editing instructions to the egress processing engine. Generally, when the selector transmits the intermediate data packet from the ingress pipeline to the egress pipeline, the egress parser of the egress pipeline can parse the received intermediate packet to access portions of that packet. Various lookups can be performed on the egress data tables using the parsed data packet and the metadata to obtain appropriate editing instructions that feed into the egress processing engine. The editing instructions can direct actions performed by the egress processing engine to produce a corresponding egress data packet.

In accordance with some embodiments, network device 10 can be configured to support virtual routing and forwarding (VRF). VRF is a technology used in computer networking that allows for the creation of multiple virtual routing tables on a single device 10. This can be achieved by partitioning device 10 into multiple virtual switches or routers (sometimes referred to as VRF or virtual "instances"), each with its own independent routing table and forwarding database. In other words, each VRF instance (or virtual instance) can maintain a separate and independent routing table. VRF is often used in large enterprise networks, service provider networks, and data centers to provide network segmentation, traffic isolation, and improved network performance. By creating separate routing tables for different applications or user groups, VRF can prevent traffic collisions and provide more efficient routing for each application or user group.

Some advantages of VRF include its ability to support overlapping IP (internet protocol) addresses. In other words, multiple VRF instances can use the same IP address space without conflict, which can be useful in large service provider networks where many customers may be using the same IP address ranges. VRF can also be employed to enhance network security, as it allows for the creation of multiple independent routing domains that are isolated from each other. This can help prevent unauthorized access to sensitive network resources and provide an additional layer of security for critical network applications. Another benefit of VRF is its ability to provide support for multiple routing protocols on the same physical network. In other words, different VRF instances can use different routing protocols, allowing for greater flexibility and customization in network design and deployment.

Network device 10 can also be configured to support reverse path forwarding (RPF). RPF is a packet routing technique used to validate the source IP address of incoming packets to ensure that the incoming packet is received only from the intended senders. There can be different types of RPF depending on the network topology and requirements. One type of RPF is multicast RPF, which can be used to ensure loop-free forwarding of multicast packets. When a multicast packet arrives at an interface of device 10, device 10 can look up a list of networks that are reachable via that interface. If device 10 finds a matching routing entry for the source IP address of the multicast packet, then RPF check passes and the packet is forwarded to all other interfaces participating in the same multicast group. If the RPF check fails, then the packet is dropped.

Another type of RPF is unicast RPF, which can be used to prevent IP address spoofing attacks in unicast traffic. Unicast RPF (uRPF) leverages the idea that all devices 10 have their own routing table, sometimes referred to as a routing information base (RIB) or forwarding information base (FIB). A data packet should only be forwarded if it comes from a router's best route to the source of that packet. Packets arriving via an interface associated with valid subnetworks (as indicated by the corresponding entry in the routing table) are forwarded. Packets with source addresses that could not be reached via the ingress interface can be dropped without disrupting the normal operation of device 10. Such packets are presumed to originate from a malicious source or unintended misconfiguration. In other words, the unicast RPF algorithm checks whether an incoming packet arrives on the interface that would be used to forward packets back to the source address of that packet. If the source address is determined to be valid, then the packet is forwarded. If the source address is invalid or if the packet arrives on the wrong interface, then the packet can be dropped.

Unicast RPF can operate in a variety of modes including a strict mode and a loose mode. In the strict mode, the uRPF algorithm checks whether the incoming packet arrived on the exact interface that would be used to forward packets back to the source address (e.g., by using the packet's source address to identify the exact interface as listed in the routing table). If the incoming packet did not arrive on that exact interface, then the packet would be dropped or discarded. In the loose mode, the unicast RPF algorithm checks whether the incoming packet arrived on any interface that is connected to the same subnet, subnetwork, or VRF instance as the interface that would be used to forward packets back to the source address (sometimes referred to herein as the source interface). This can be done by using the packet's source address to identify any interface that is part of the same subnet or VRF instance that includes the source interface as listed in the routing table. If the incoming packet arrived on an interface that is not part of the same subnet or VRF instance that includes the source interface, then the packet can be dropped or discarded.

Figure 2:
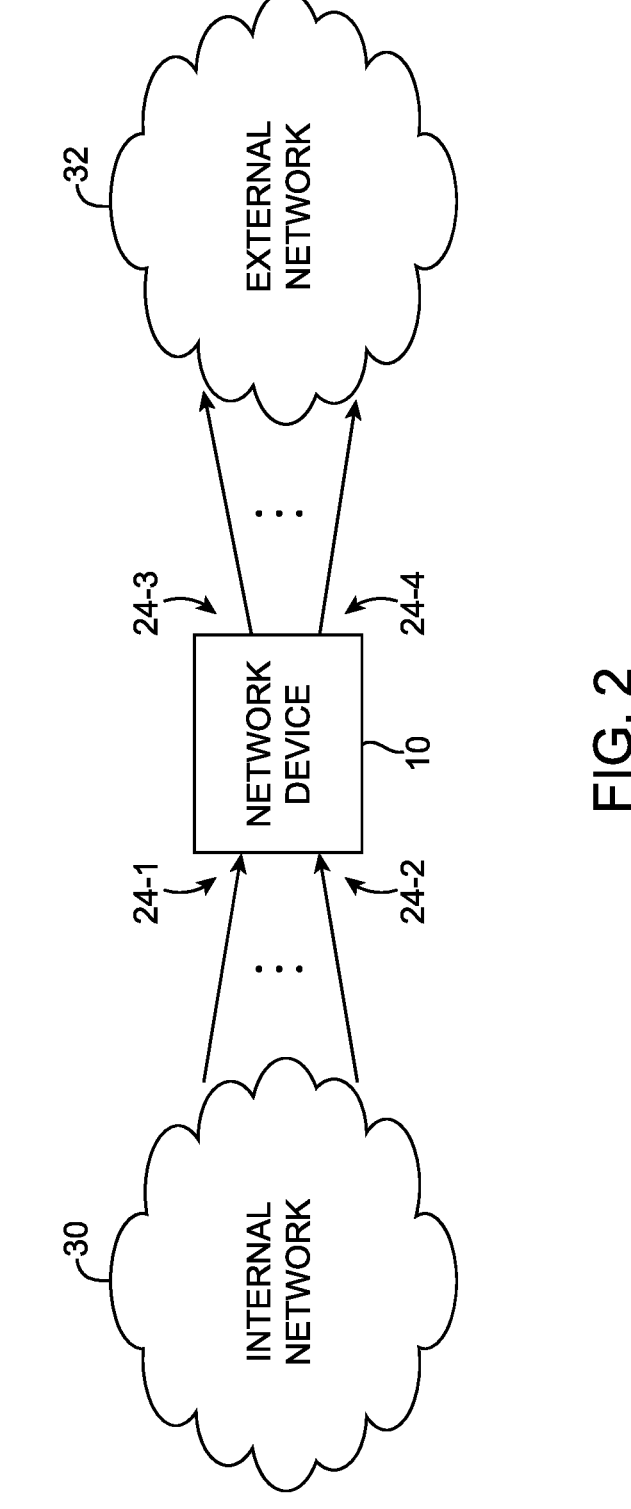
FIG. 2 is a diagram of an illustrative network device connecting an internal network to an external network in accordance with some embodiments.

FIG. 2 is a diagram of a network or system 28 that includes an illustrative network device 10 connecting an internal network such as internal network 30 to an external network such as external network 32. As shown in FIG. 2, internal network 30 can be couple to network device 10 via one or more ports such as ports 24-1 and 24-2, whereas external network 32 can be coupled to network device 10 via one or more ports such as ports 24-3 and 24-4. These ports 24 can represent physical input-output (IO) ports or can represent logical interfaces (e.g., interfaces of a virtual network or VRF instance). The example of FIG. 2 in which network device 10 is coupled to internal network 30 via two interfaces 24-1 and 24-2 and is coupled to external network 32 via two interfaces 24-3 and 24-4 is merely illustrative. In general, network device 10 can be coupled to internal network 30 via only one interface, two or more interfaces, three to five interfaces, five to ten interfaces, 10 to 100 interfaces, hundreds of interfaces, or thousands of physical or logical interfaces. Similarly, network device 10 can be coupled to external network 32 via only one interface, two or more interfaces, three to five interfaces, five to ten interfaces, 10 to 100 interfaces, hundreds of interfaces, or thousands of physical or logical interfaces.

Network device 10 that supports both VRF and uRPF capabilities may support split VRF. Split VRF can refer to and be defined herein as a scenario where forwarding stages in a packet processing pipeline perform a first (RPF) lookup using a source VRF identifier and a second (forwarding) lookup using a forwarding VRF identifier. The RPF check can be based on the source VRF identifier and/or the forwarding VRF identifier associated with each interface, both of which can be configured by a user or admin of network device 10, and all relevant network prefixes can be published as part of the source VRF identifier. FIG. 3 is a flow chart of illustrative steps for operating a packet processing pipeline to support split virtual routing and forwarding (VRF) operation in accordance with some embodiments.

During the operations of block 100, a user or admin of network device 10 can configure each physical or logical interface of device 10 by assigning a forwarding VRF identifier (sometimes referred to herein as fwdVRF_id) and/or a source VRF identifier (sometimes referred to herein as srcVRF_id) to each interface. In general, each interface 24 of device 10 can have (1) an RPF VRF identifier and (2) a forwarding VRF identifier. The RPF VRF identifier of an interface can refer to and be defined herein as an identifier that identifies a VRF instance or virtual routing table instance that is used for RPF lookup based on the source IP address of an incoming data packet. On the other hand, the forwarding VRF identifier of an interface can refer to and be defined herein as an identifier that identifies a VRF instance or virtual routing table instance that is used to forward the incoming data packet based on the destination IP address of that packet.

In the example of FIG. 2, consider a scenario in which the forwarding VRF identifier of all interfaces 24-1, 24-2, 24-3, and 24-4 is set or configured to the same fwdVRF_id. The RPF VRF identifier of interfaces 24-3 and 24-4 coupled to the external network 32 can also be set or configured to the same fwdVRF_id. The RPF VRF identifier of interfaces 24-1 and 24-2 coupled to the internal network 30 can, however, be set or configured to a srcVRF_id that is different from the fwdVRF_id. Configured in this way, device 10 can enforce that any data packet ingressing from interfaces 24-1 and 24-2 associated with the internal network 30 belongs to a well-known source IP address. The user/admin typically does not have control over the external network 32, so the RPF VRF identifiers for external network facing ports 24-3 and 24-4 should not be set to any special srcVRF_id. In this example, only the interfaces 24-1 and 24-2 coupled to the internal network 30 have their RPF VRF identifiers assigned to srcVRF_id. This is exemplary. The user/admin, however, is free to configure split VRF on any interface (e.g., the user can optionally configure external network facing ports to have different RPF and forwarding VRF identifiers). This configuration information associated with each interface can be stored in a table sometimes referred to as a VRF mapping lookup table.

During the operations of block 102, device 10 may receive an ingress data packet from a logical interface identifiable by a port number and a virtual local area network (VLAN) identifier. The port number can refer to a physical port of device 10 (e.g., to identify a particular front panel port of a router or switch). The VLAN identifier can refer to a particular virtual network associated with device 10. For example, a first port number I1 and a first VLAN identifier V1 can correspond to a first logical interface of device 10, where the first logical interface can be an internal network facing interface or an external network facing interface. As another example, a second port number I2 and a second VLAN identifier V2 can correspond to a second logical interface of device 10, where the second logical interface can be an internal network facing interface or an external network facing interface. As another example, the first port number I1 paired with a third VLAN identifier V3 might correspond to a third logical interface of device 10, where the third logical interface can be an internal network facing interface or an external network facing interface. The ingress data packet can then be conveyed through a packet processing pipeline within device 10.

During the operations of block 104, a stage of the packet processing pipeline can perform a VRF mapping lookup using the logical interface (e.g., the logical interface identified from block 102) as a key to the VRF mapping lookup table to identify a corresponding fwdVRF_id and/or a srcVRF_id. For example, a VRF mapping lookup based on a first internal network facing logical interface could yield a fwdVRF_id and a srcVRF_id. As another example, a VRF mapping lookup based on a second internal network facing logical interface could yield the same fwdVRF_id and srcVRF_id, assuming the two internal network facing logical interfaces are configured as such by the admin during block 100. As another example, a VRF mapping lookup based on a first external network facing logical interface could yield only the fwdVRF_id without any srcVRF_id. Similarly, a VRF mapping lookup based on a second external network facing logical interface could yield only the fwdVRF_id without any srcVRF_id.

These examples are illustrative. In other embodiments, if the user/admin has configured the first and/or second external network facing logical interfaces with a srcVRF_id, then the VRF mapping lookup could yield such srcVRF_id for those interfaces. After the VRF mapping lookup, a profile (or flag) can be set to "1" if both fwdVRF_id and srcVRF_id have been identified or can be set to "0" if only fwdVRF_id but no srcVRF_id has been identified. In other words the profile is set high or asserted only if a srcVRF_id exists. This profile is sometimes referred to as a split VRF profile or a split VRF flag. Here, the VRF profile is a one bit value but can in general be represented using any number of bits.

During the operations of block 106, the forwarding VRF identifier of the data packet can be set to the fwdVRF_id obtained from block 104. If no fwdVRF_id was obtained during block 104, then the forwarding VRF identifier can be set to a default VRF identifier. During block 106, the profile that is set either to one or zero and the srcVRF_id (if identified during block 104) can be stored as metadata. During the operations of block 108, the metadata can be carried along with the data packet as they traverse the packet processing pipeline through one or more intermediate pipeline stages.

During the operations of block 110, the data packet and the associated metadata can arrive at one or more forwarding stages. At this point, the profile and the srcVRF_id (if it exists) can be retrieved or extracted from the metadata. If the profile is set to "1", then the RPF VRF identifier (sometimes referred to herein as rpfVRF_id) of the data packet can be set to the recently extracted srcVRF_id. Else if the profile is set to "0", then the rpfVRF_id can be set to the fwdVRF_id that is set during block 106.

The forwarding stages can include a first forwarding stage that performs a first (RPF) lookup operation and a second forwarding stage that performs a second (forwarding) lookup operation. During the operations of block 112, an RPF lookup can be performed using the rpfVRF_id and a source IP (internet protocol) address of the data packet as keys to a forwarding table or forwarding information base (FIB) to identify a next hop for the data packet. The rpfVRF_id can either be set equal to the srcVRF_id or the fwdVRF_id. If a next hop is not identifiable by the RPF lookup (a phenomenon sometimes referred to and defined herein as a forwarding table "miss"), then the data packet can be dropped as shown by block 118. For example, a miss might occur when the route is not present in the rpfVRF_id. If, however, a next hop is identifiable by the RPF lookup (a phenomenon sometimes referred to and defined herein as a forwarding table "hit"), then proceed to a forwarding lookup operation of block 114. For example, a hit might occur when the route is present in the rpfVRF_id.

During the operations of block 114, a forwarding lookup can be performed using the fwdVRF_id and the destination IP address as keys to the forwarding table or FIB to identify a next hop for the data packet. The RPF and the forwarding lookups may refer to the same forwarding table. Since the RPF lookup is based on the source IP address and the rpfVRF_id (which can be equal to or different than fwdVR-F_id depending on whether the profile is set to "1" or "0") whereas the forwarding lookup is based on the destination IP address and the fwdVRF_id, the next hop identified by block 112 is generally different than the next hop identified by block 114. During the operations of block 116, the data packet can then be forwarded to the corresponding next hop identified by the forwarding lookup of block 114. This process can be iterated for each incoming data packet.

The operations of FIG. 3 are merely illustrative. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations need not be limited to a network device 10 and may be distributed in a larger system.

Figure 4:
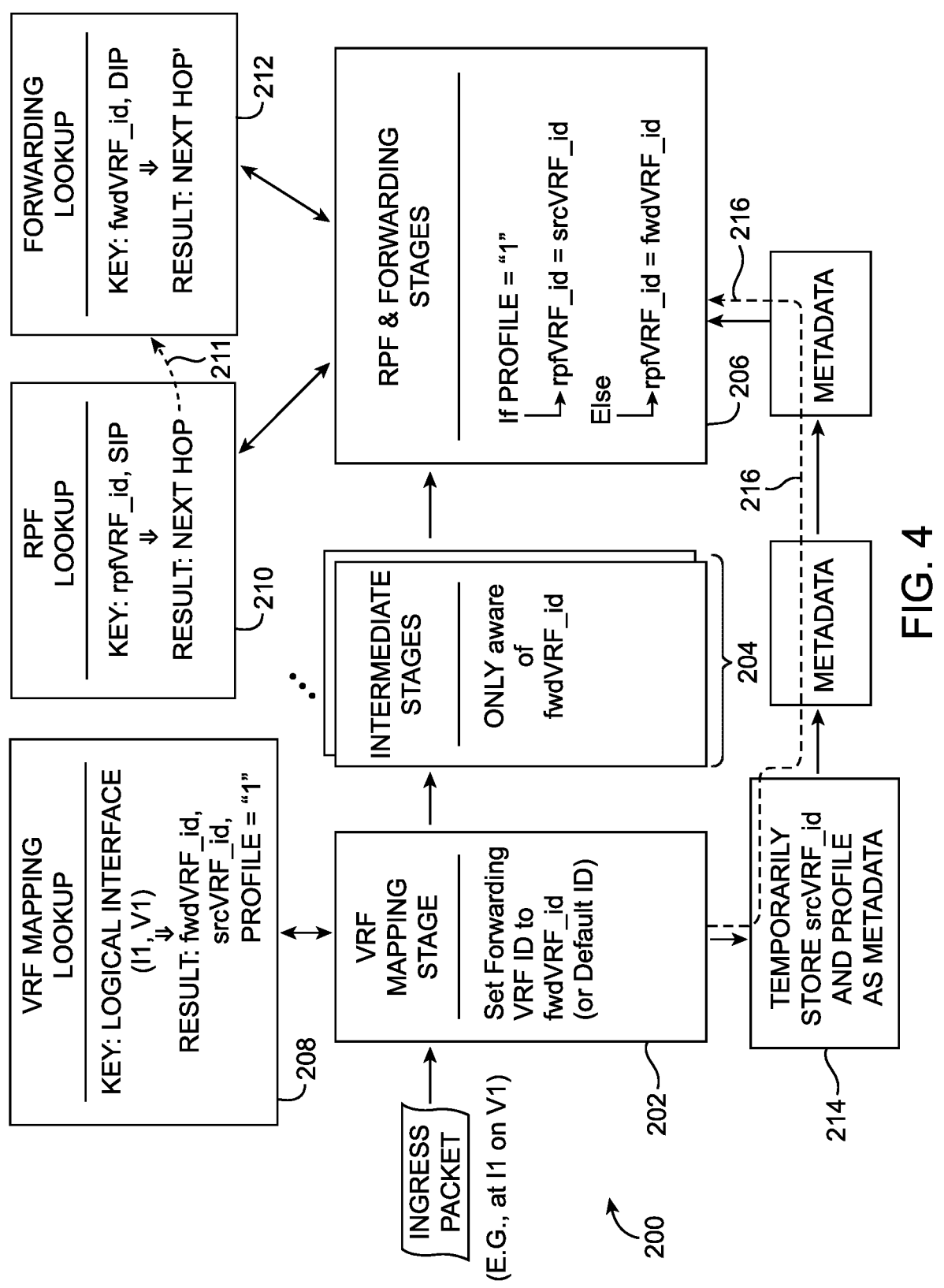
FIG. 4 is a diagram of an illustrative packet processing pipeline that receives an ingress packet from a logical port associated with a forwarding VRF identifier and a source VRF identifier in accordance with some embodiments.

FIG. 4 is a diagram of an illustrative packet processing pipeline such as packet processing pipeline 200 that receives a data packet from a logical interface associated with a forwarding VRF identifier (fwdVRF_id) and a source VRF identifier (srcVRF_id) in accordance with some embodiments. As shown in FIG. 4, the packet processing pipeline 200 can include a mapping stage such as VRF mapping stage 202 and one or more forwarding stages such as RPF and forwarding stages 206. One or more intermediate stages such as intermediate stage(s) 204 can be interposed between the VRF mapping stage 202 and the RPF and forwarding stage 206 in packet processing pipeline 200. VRF mapping stage 202 and forwarding stages 206 can sometimes be considered to be part of the ingress pipeline (see ingress pipeline 20 of FIG. 1). The one or more intermediate stages 204 can also optionally be considered to be part of the ingress.

In the example of FIG. 4, an incoming data packet (sometimes referred to as an ingress packet) can arrive at a specific port number with an associated VLAN identifier (e.g., port number I1 and VLAN identifier V1 as shown in FIG. 4). The ingress data packet may first be processed by the VRF mapping stage 202. The VRF mapping stage 202 may perform a VRF mapping lookup operation such as a VRF mapping lookup 208. During the VRF mapping lookup 208, the port number I1 and the VLAN identifier V1 can identify a corresponding logical interface of device 10, which can be used as a key to a VRF mapping lookup table. Here, the result of the VRF mapping lookup 208 can yield a corresponding fwdVRF_id and srcVRF_id (e.g., assuming the user/admin has previously configured this particular logical interface to have a split VRF setting with different RPF and forwarding VRF identifiers).

Since both a fwdVRF_id and a separate (different) srcVR-F_id are identified by the VRF mapping lookup, the VRF profile can be set to one or other value. After the fwdVRF_id is identified, the forwarding VRF identifier of the data packet can be set or mapped to fwdVRF_id. If a fwdVRF_id is not available, then the forwarding VRF identifier of the data packet can be set to a default VRF ID value. During the VRF mapping stage 202, at least the srcVRF_id and the profile can be temporarily stored as metadata (see operations of block 214) that is conveyed along with the data packet as it traverses the packet processing pipeline. This metadata is sometimes referred to as forwarding metadata.

Subsequent to the VRF mapping stage 202, the data packet can be conveyed through intermediate stages 204. The intermediate packet processing stages 204 can include processes not necessarily related to VRF operation such as a tunneling stage for creating a virtual tunnel between two endpoints, a termination stage for selectively removing or extracting a packet header or other portions of a data packet, a classification stage for ensuring quality of service (QoS) policies, encryption/decryption stage(s) for encrypting or decrypting packet contents to ensure data confidentiality and integrity, and/or other intermediate packet processing pipeline stages. During the intermediate stages 204, the forwarding VRF identifier of the data packet remains as fwdVRF_id as set during the VRF mapping stage 202. In general, the intermediate stages 204 can include only one stage, two or more stages, three or more stages, four or more stages, five to ten stages, or more than ten stages.

Subsequent to the intermediate stages 204, the data packet can be conveyed to RPF and forwarding stages 206. The RPF VRF identifier (rpfVRF_id) of the data packet can be set depending on the VRF profile value. The VRF profile value of the data packet can be retrieved or extracted from the metadata that is carried along with the data packet through the packet processing pipeline, as shown by dotted path 216. If the profile is set to one, then the rpfVRF_id can be set equal to the srcVRF_id. The srcVRF_id can be retrieved or extracted from the metadata that is carried along with the data packet through the packet processing pipeline, as shown by dotted path 216. If the profile is not set to one (e.g., if the profile has a value of zero or other value), then the rpfVRF_id can be set equal to the fwdVRF_id. In the example of FIG. 4, the profile is set to "1", so rpfVRF_id is set equal to srcVRF_id.

The RPF and forwarding stages 206 can include performing an RPF lookup 210 and a forwarding lookup 212. During the RPF lookup 210, the rpfVRF_id and the source IP (SIP) address of the data packet can be used as keys to lookup a forwarding table (e.g., a FIB) to identify a next hop. If a next hop is found in the forwarding table (i.e., if there is a "hit" in the FIB), processing can continue to the forwarding lookup 212 as indicated by dotted arrow 211. In some embodiments, the forwarding lookup 212 can occur only if the RPF lookup results in a hit. In other embodiments, the forwarding lookup 212 can ensue regardless of whether the RPF lookup results in a hit. During the forwarding lookup 212, the fwdVRF_id and the destination IP (DIP) address of the data packet can be used as keys to the same forwarding table used for the RPF lookup to identify a next hop. The next hop identified by forwarding lookup 212 should be different than the next hop identified by the RPF lookup 210. The data packet can then be forwarded to the next hop identified by forwarding lookup 212.

Figure 5:
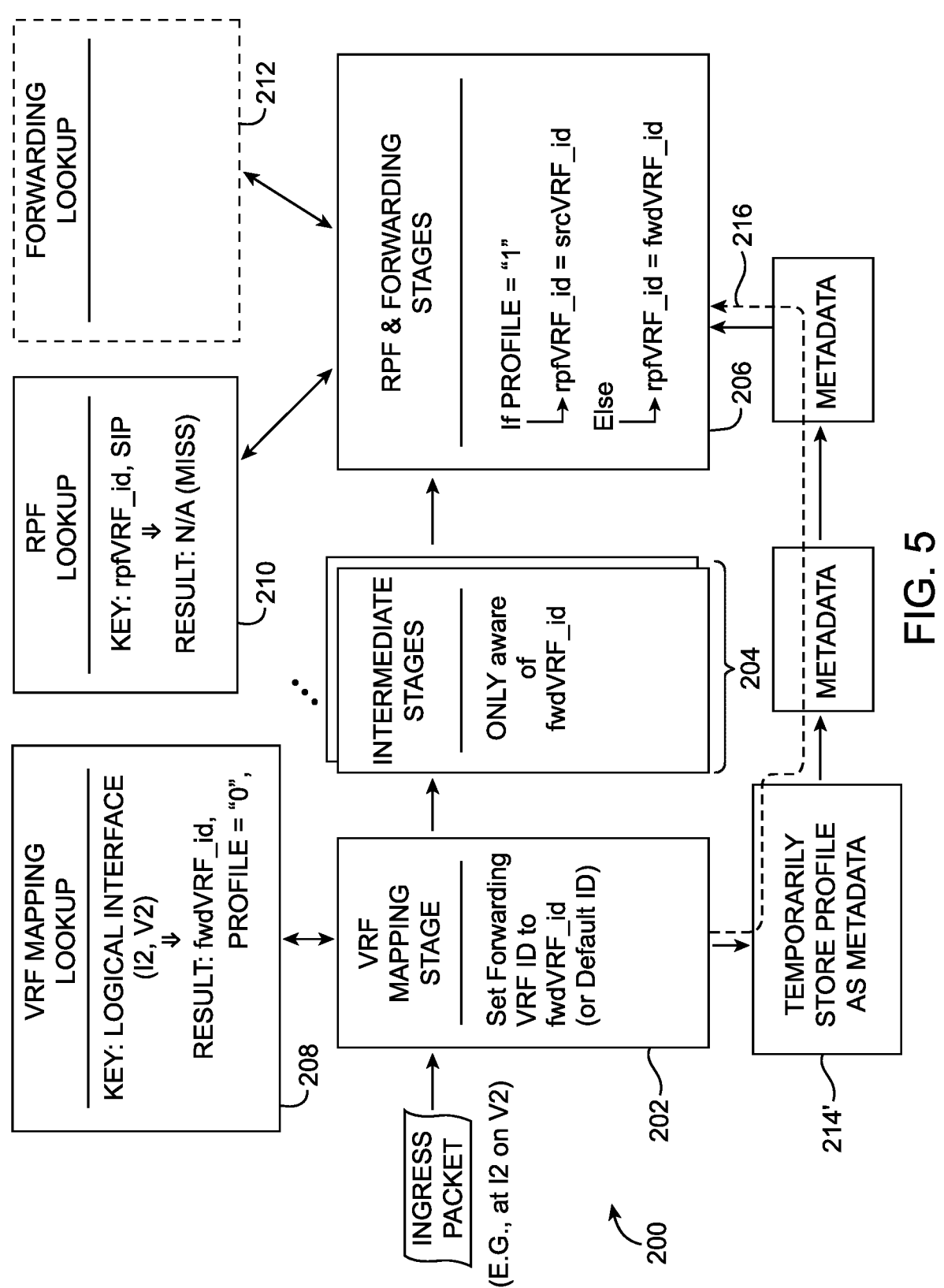
FIG. 5 is a diagram of an illustrative packet processing pipeline that receives an ingress packet from a logical port associated with a forwarding VRF identifier but no source VRF identifier in accordance with some embodiments.

The example of FIG. 4 in which the logical interface through which the ingress packet arrived has an assigned srcVRF_id is illustrative. FIG. 5 shows another example in which an incoming data packet arrives at another logical interface that is not assigned a source VRF identifier. As shown in FIG. 5, an ingress data packet may arrive at physical port number I2 with an associated VLAN identifier V2. The ingress data packet may first be processed by the VRF mapping stage 202. The VRF mapping stage 202 may perform VRF mapping lookup 208.

During the VRF mapping lookup 208, the port number I2 and the VLAN identifier V2 can identify a corresponding logical interface of device 10, which can be used as a key to the VRF mapping lookup table. Here, the result of the VRF mapping lookup 208 can yield a corresponding fwdVRF_id without any srcVRF_id (e.g., assuming the user/admin has previously configured this particular logical interface with only a forwarding VRF identifier but no source VRF identifier).

Since only a fwdVRF_id is identified by the VRF mapping lookup, the VRF profile can be set to zero or other value. After the fwdVRF_id is identified, the forwarding VRF identifier of the data packet can be set or mapped to fwdVRF_id. If a fwdVRF_id is not available, then the forwarding VRF identifier of the data packet can be set to a default ID value. During the VRF mapping stage 202, the profile can be temporarily stored as metadata (see operations of block 214') that is conveyed along with the data packet as it traverses the packet processing pipeline. This metadata is sometimes referred to as forwarding metadata.

Subsequent to the VRF mapping stage 202, the data packet can be conveyed through intermediate stages 204. During the intermediate stages 204, the forwarding VRF identifier of the data packet remains as fwdVRF_id as set during the VRF mapping stage 202. In general, the intermediate stages 204 can include only one stage, two or more stages, three or more stages, four or more stages, five to ten stages, or more than ten stages.

Subsequent to the intermediate stages 204, the data packet can be conveyed to RPF and forwarding stages 206. The RPF VRF identifier (rpfVRF_id) of the data packet can be set depending on the profile value. The profile value of the data packet can be retrieved or extracted from the metadata that is carried along with the data packet through the packet processing pipeline, as shown by dotted path 216. If the profile is set to one, then the rpfVRF_id can be set equal to the srcVRF_id. The srcVRF_id can be retrieved or extracted from the metadata that is carried along with the data packet through the packet processing pipeline, as shown by dotted path 216. If the profile is not set to one (e.g., if the profile has a value of zero or other value), then the rpfVRF_id can be set equal to the fwdVRF_id. In the example of FIG. 5, the profile is set to "0", so rpfVRF_id is set equal to fwdVRF_id.

The RPF and forwarding stages 206 can include performing an RPF lookup 210 and optionally a forwarding lookup 212. During the RPF lookup 210, the rpfVRF_id and the source IP (SIP) address of the data packet can be used as keys to lookup a forwarding table (e.g., a FIB) to identify a next hop. If a next hop is found in the forwarding table (i.e., if there is a "hit" in the FIB), processing can continue to the forwarding lookup 212. If a next hop is not found in the forwarding table (i.e., if there is a "miss" in the FIB), then the forwarding lookup 212 can be omitted or skipped. In the example of FIG. 5, a forwarding table miss occurs and forwarding lookup 212 is skipped. In other embodiments, the forwarding lookup 212 can ensue regardless of whether the RPF lookup results in a hit or miss. When a miss occurs, the data packet can be dropped to realize the unicast RPF capability.

Figure 6:
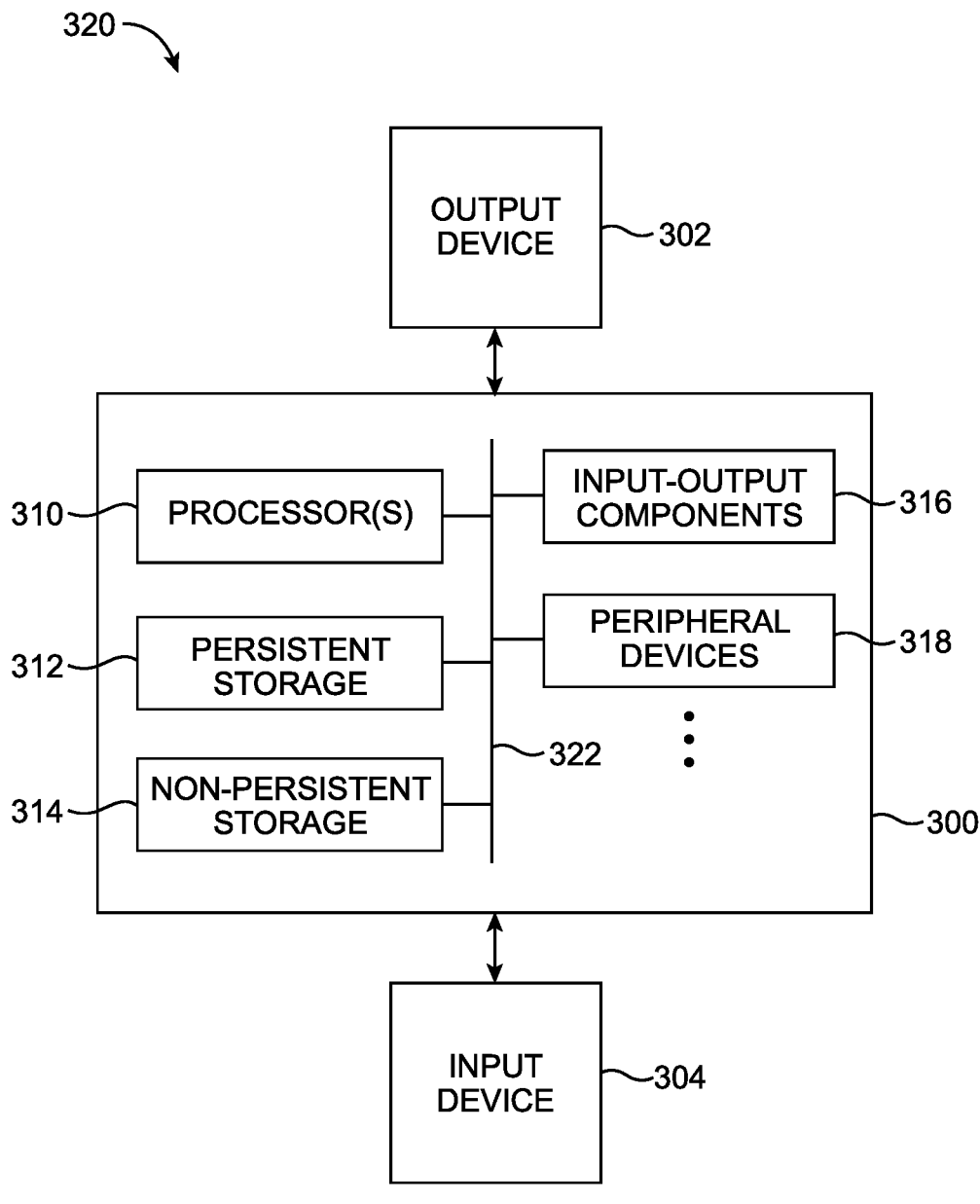
FIG. 6 is a diagram showing illustrative hardware components within a data processing system in accordance with some embodiments.

The foregoing embodiments may be made part of a larger system. FIG. 6 shows a system such as data processing system 320. Data processing system 320 may include a network device 300 optionally coupled to an input device 104 and/or an output device 102. Network device 300 may represent a network device 10 described in connection with the embodiments of FIGS. 1-5. Network device 300 may include one or more processors 310 (e.g., CPU 12 of FIG. 1), storage circuitry such as persistent storage 312 (e.g., flash memory or other electrically-programmable read-only memory configured to form a solid-state drive, a hard disk drive, etc.), non-persistent storage 314 (e.g., volatile memory such as static or dynamic random-access memory, cache memory, etc.), or any suitable type of computer-readable media for storing data, software, program code, or instructions, input-output components 316 (e.g., communication interface components such as a Bluetooth® interface, a Wi-Fi® interface, an Ethernet interface, an optical interface, and/or other networking interfaces for connecting device 300 to the Internet, a local area network, a wide area network, a mobile network, other types of networks, and/or to another network device), peripheral devices 318, and/or other electronic components. These components can be coupled together via a system bus 322.

As an example, network device 300 can be part of a host device that is coupled to one or more output devices 302 and/or to one or more input device 304. Input device(s) 304 may include one or more touchscreens, keyboards, mice, microphones, touchpads, electronic pens, joysticks, buttons, sensors, or any other type of input devices. Output device(s) 306 may include one or more displays, printers, speakers, status indicators, external storage, or any other type of output devices.

System 320 may be part of a digital system or a hybrid system that includes both digital and analog subsystems. System 320 may be used in a wide variety of applications as part of a larger computing system, which may include but is not limited to: a datacenter, a financial system, an e-commerce system, a web hosting system, a social media system, a healthcare/hospital system, a computer networking system, a data networking system, a digital signal processing system, an energy/utility management system, an industrial automation system, a supply chain management system, a customer relationship management system, a graphics processing system, a video processing system, a computer vision processing system, a cellular base station, a virtual reality or augmented reality system, a network functions virtualization platform, an artificial neural network, an autonomous driving system, a combination of at least some of these systems, and/or other suitable types of computing systems.

The methods and operations described above in connection with FIGS. 1-6 may be performed by the components of a network device using software, firmware, and/or hardware (e.g., dedicated circuitry or hardware). Software code for performing these operations may be stored on non-transitory computer readable storage media (e.g., tangible computer readable storage media) stored on one or more of the components of the network device. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device (e.g., processor 12 and/or processor 16 of FIG. 1, processor 310 of FIG. 6, etc.).

The foregoing is merely illustrative and various modifications can be made to the described embodiments. The foregoing embodiments may be implemented individually or in any combination.

What is claimed is:

1. A method of operating a network device comprising:
    receiving a data packet via a logical interface;

performing virtual routing and forwarding (VRF) mapping lookup to identify, using the logical interface, a forwarding VRF identifier and a source VRF identifier;

setting a VRF profile equal to a first value in response to identifying the forwarding VRF identifier and the source VRF identifier or to a second value different than the first value in response to identifying the forwarding VRF identifier without the source VRF identifier;

identifying a next hop by performing reverse path forwarding (RPF) lookup using the source VRF identifier;

identifying an additional next hop by performing forwarding lookup using the forwarding VRF identifier; and forwarding the data packet to the additional next hop identified by the forwarding lookup.

2. The method of claim 1, wherein performing the VRF mapping lookup comprises using the logical interface as a key to a VRF mapping lookup table.

3. The method of claim 1, further comprising:

storing the source VRF identifier and the VRF profile as metadata associated with the data packet.

4. The method of claim 3, further comprising:

retrieving the source VRF identifier from the metadata; and in response to the VRF profile being set equal to the first value, setting a reverse path forwarding (RPF) VRF identifier to the retrieved source VRF.

5. The method of claim 4, further comprising:

in response to the VRF profile being set equal to the second value, setting the RPF VRF identifier to the forwarding VRF identifier.

6. The method of claim 5, further comprising:

in response to the RPF lookup not identifying a next hop based on the RPF VRF identifier and the source address of the data packet, dropping the data packet; and in response to the forwarding lookup identifying an additional next hop based on the forwarding VRF identifier and the destination address of the data packet, forwarding the data packet to the additional next hop.

7. The method of claim 1, wherein identifying the next hop further comprises performing the RPF lookup using the source VRF identifier and a source address of the data packet as keys to lookup a forwarding table.

8. A method of operating a network device comprising:

receiving a data packet via an interface;

performing virtual routing and forwarding (VRF) mapping lookup to identify, based on the interface, a forwarding VRF identifier and a source VRF identifier;

setting a VRF profile based on whether the VRF mapping lookup identifies the source VRF identifier;

setting a reverse path forwarding (RPF) VRF identifier to the source VRF identifier when the VRF profile has a first value or to the forwarding VRF identifier when the VRF profile has a second value different than the first value; and forwarding the data packet based on the forwarding VRF identifier.

9. The method of claim 8, further comprising:

prior to performing forwarding operations, extracting the source VRF identifier from metadata associated with the data packet.

10. The method of claim 8, further comprising:

performing RPF lookup based on the RPF VRF identifier to identify a first next hop; and performing forwarding lookup based on the forwarding VRF identifier to identify a second next hop different than the first next hop.

11. A system comprising:

an interface configured to receive a data packet;

a virtual routing and forwarding (VRF) mapping stage configured to perform a VRF mapping lookup operation to identify first and second VRF identifiers and to set a VRF profile to a first value responsive to identifying the first VRF identifier or to a second value, different than the first value, responsive to identifying the first VRF identifier without the second VRF identifier, a first forwarding stage configured to perform a reverse path forwarding (RPF) lookup operation to identify a first next hop based on at least the first VRF identifier, wherein an RPF VRF identifier is set to the second VRF identifier when the VRF profile has the first value or to the first VRF identifier when the VRF profile has the second value; and a second forwarding stage configured to perform a forwarding lookup operation to identify a second next hop based on at least the second VRF identifier, wherein the data packet is forwarded to the second next hop.

12. The system of claim 11, further comprising:

one or more intermediate stages interposed between the VRF mapping stage and the first forwarding stage.

13. The system of claim 12, wherein during the VRF mapping lookup operation, a flag is asserted and wherein the asserted flag and the first VRF identifier are stored as metadata that is conveyed through the one or more intermediate stages along with the data packet.

14. The system of claim 13, wherein:

during the first forwarding stage, the first VRF identifier is retrieved from the metadata; and the first forwarding stage is configured to perform the RPF lookup operation using the retrieved first VRF identifier and a source address of the data packet as keys to lookup a forwarding information base (FIB).

15. The system of claim 14, wherein the second forwarding stage is configured to perform the forwarding lookup operation using the second VRF identifier and a destination address of the data packet as keys to lookup the FIB.

* * * * *